United States Patent [19]
Peterson et al.

[11] Patent Number: 5,170,393
[45] Date of Patent: * Dec. 8, 1992

[54] ADAPTIVE ROUTING OF MESSAGES IN PARALLEL AND DISTRIBUTED PROCESSOR SYSTEMS

[75] Inventors: John C. Peterson, Alta Loma; Edward T. Chow, San Dimas, both of Calif.

[73] Assignee: California Institute of Technology, Pasadena, Calif.

[*] Notice: The portion of the term of this patent subsequent to Apr. 16, 2008 has been disclaimed.

[21] Appl. No.: 620,735

[22] Filed: Dec. 3, 1990

Related U.S. Application Data

[63] Continuation-in-part of Ser. No. 353,754, May 18, 1989, abandoned.

[51] Int. Cl.⁵ .............................................. H04J 3/24
[52] U.S. Cl. ...................................... 370/94.1; 370/60
[58] Field of Search ................... 370/60, 54, 94.1, 94.3

[56] References Cited

U.S. PATENT DOCUMENTS

| | | | |
|---|---|---|---|
| 4,598,400 | 7/1986 | Hillis | 370/94.1 |
| 4,999,833 | 3/1991 | Lee | 370/94.3 |
| 5,008,882 | 4/1991 | Peterson et al. | 370/94.1 |

Primary Examiner—Douglas W. Olms
Assistant Examiner—Shick Hom
Attorney, Agent, or Firm—Leonard Tachner

[57] ABSTRACT

In a multi-node network containing a plurality of parallel and distributed nodes, this invention reduces the time to establish a through-path or make a decision that no through-path can be established at the present time. In one aspect, each node that can be an originating node contains connectivity analysis logic which performs a minimum cycle breakdown of the possible paths between the originating node and the destination node to establish a list of nodes to be tried before attempting to establish a through-path to a destination node whereby exhaustive testing of all paths is not undertaken. In another, each node that can be an intermediate node contains pruning logic for pruning a non-variable tested path and all associated paths depending therefrom from further testing whereby redundant testing of paths which will result in failure is eliminated. In yet another, each node that can be an intermediate node contains backtracking logic for not waiting at the node for a link to a busy next-adjacent further node to free up and for backtracking to a next-adjacent previous node when no next-adjacent further node is immediately non-busy. Additionally, each node contains an intelligent channel having a separate path setup mode in which the function of path establishing is performed and data transmission mode in which the function of data transfer is performed whereby transmitted data passes through the nodes without processing time being added.

20 Claims, 7 Drawing Sheets

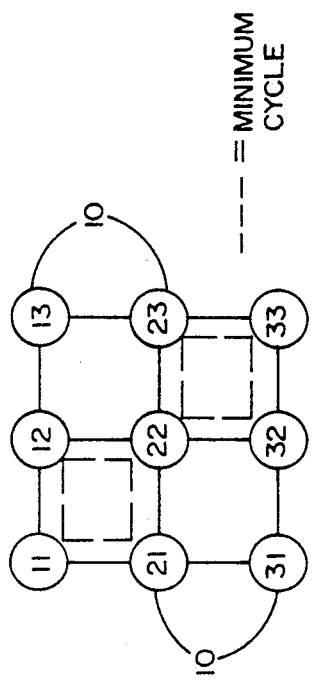
FIG. 7
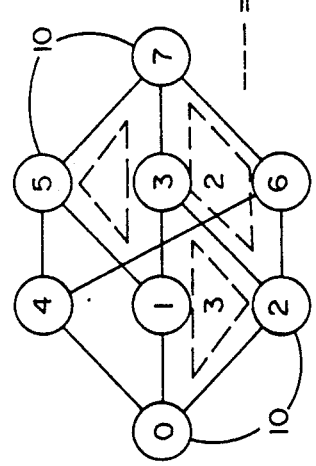
FIG. 5
FIG. 6
- - - - = MINIMUM CYCLE

SEND MESSAGE FROM NODE 0 TO NODE 16

NODES NEED TO BE VISITED FOR SHORTEST DISTANCE 0,3
0,9,5
3,7,4,16
3,1,8,16
5,14,16

NODES NEED TO BE VISITED FOR SHORTEST DISTANCE +1

ADAPTIVE ROUTING OF MESSAGES IN PARALLEL AND DISTRIBUTED PROCESSOR SYSTEMS

CROSS-REFERENCE TO RELATED APPLICATION

This application is a continuation-in-part of U.S. patent application Ser. No. 07/353,754 filed May 18, 1989 and now abandoned.

TECHNICAL FIELD

The invention relates to parallel and distributed computer systems and, more particularly, to an adaptive method and apparatus for routing messages in any given parallel and distributed network topology of such systems.

BACKGROUND ART

More particularly, the present invention relates to a method of adaptive routing for use in systems containing a plurality of parallel and distributed nodes for routing messages from an originating node to a destination node while reducing the time to establish a through-path from the originating node to the destination node or make a decision that no through-path can be then established. The apparatus of the invention comprises a separate node processor disposed in association with each node, each node processor containing computing means and associated logic for execution thereby for making switching decisions from header information associated with messages being routed thereby; and an intelligent channel connected to the node processor to be controlled thereby, each intelligent channel having two separate operating modes. One of the two modes is a path setup mode in which a function of establishing a path from an originating node to a destination node from the header information preceding data associated with the message is performed. The other of the two modes is a data transmission mode in which a function of transferring data associated with the message is performed. Each intelligent channel provides a plurality of input lines for connecting to the intelligent channels of next adjacent nodes to receive inputs therefrom and a plurality of output lines for connecting to the intelligent channels of next adjacent nodes to transmit outputs thereto. The input lines of a node are connected directly to the output lines when the intelligent channel of a node is in the data transmission mode whereby when the intelligent channel is in the data transmission mode the data passes directly through the associated node and has no processing time added thereto by the associated node.

In the preferred embodiment, each node includes an intelligent channel for performing the steps of, when the associated node is an originating node, originating and sending a header with the destination node's address embedded in the header to a selected next neighboring node's intelligent channel and reserving the path through which the header travels. When the associated node is an intermediate node the input lines thereof are connected to the output lines thereof whereby the intermediate node is placed in the data transmission mode. The foregoing process is repeated until the header reaches the destination node and when the associated node is a destination node, an acknowledgment is sent back to the source node through the intermediate nodes to establish a network connection pipeline communication path in the data transmission mode so that messages can start to be transmitted by the originating node.

In another aspect of the preferred embodiment, each intelligent channel of each node that can be an originating node, contains connectivity analysis logic which performs a minimum cycle breakdown of the possible paths between the originating node and the destination node to establish a list of nodes disposed along possible paths to be tried before attempting to establish a through-path to a destination node along the possible paths whereby exhaustive testing of all paths is not undertaken before success or failure is determined.

In still another aspect of the preferred embodiment, each intelligent channel of each node that can be an intermediate node along a through-path contains pruning logic for pruning a non-available tested path and all associated paths depending on the non-available path, from further testing during a process of finding an available path between the originating node and the destination node whereby redundant testing of paths which will result in failure is eliminated. The preferred embodiment also includes backtracking logic for not waiting at the node for a link to a busy next-adjacent further node to free up and for backtracking to a next-adjacent previous node when no next-adjacent further node is immediately non-busy.

In the field of digital computers, particularly in the area of large-scale distributed or parallel computing systems as characterized by the so-called "hypercube", a large number of such computing nodes (i.e. processors) are interconnected in a manner which allows any node to transmit a "message" to any other node. Typically, the routing of the messages from an originating node to a destination node must travel through the routing portions of a number of intermediate nodes. To accomplish this, the message is provided by the originating node with a header somehow designating the destination node or a route thereto. In a ring configuration, there is only one path extending from node to node to node in a loop. Like a multiplex scheme, as a message passes each node on the loop the node looks to see if its designation is the destination for the message. If it is, the message is pulled from the loop and processed. If not, it is merely passed on to the next node in line.

In a distributed or parallel computing system environment, on the other hand, each node has a number of incoming paths and a number of outgoing paths. The switching logic of the system must be sufficient to properly route the message along a path to its destination. To accomplish this in the prior art, a number of approaches have been suggested and, in some cases, implemented. A centralized switching network may be employed. This eliminates any "thinking" at the node level; but, can result in bottle necks and much lost time in the aggregate. In one known scheme, the sender provides a routing map to the destination node as part of the message header. This places a high burden on the message transmitting logic at each node. The switching logic at each node, on the other hand is quite simple. In another approach, the sender simply designates the destination node and each intermediate node makes the decision as to which path to switch the message onto as it moves towards its destination. Thus, the sending logic at each node is simple; but, its switching logic is more complex. The main problem with these latter two approaches in particular is delay time.

The common telephone is a well known example of message switching in a distributed environment. Virtually all the telephones in the world are interconnected by what can be considered as a vast a switching network where the switching decision is made at each node (i.e. switching station) along the path between the caller and the receiver. As in out last above-mentioned example, all the caller provides is the destination identifier (i.e. the receiver's telephone number). At each "node", the switching circuit attempts to establish a connection to a next node in the path. If a path cannot be established in a first direction, alternate directions are tried exhaustively until a connection is finally made; or, in the alternative, a failure is sensed (at which time the caller receivers a pre-recorded "sorry" message).

Such an approach is acceptable in a human calling environment; that is, it is completely acceptable for several seconds to elapse between the time the caller dials the number and the time when the intermediate switching has established a connection to the receiver and the receiver's phone "rings". A comparable approach is also generally acceptable in a small distributed computer network comprising only a few nodes. However, for ensemble multiprocessors, it is desirable to make message passing time closer to local memory access time so that processes do not have to wait for data to arrive. Thus, the latency for these machines should be as small as possible (typically a few to a few hundred microseconds for the new generation of 20 MIPS RISC microprocessors).

An ideal operating environment would be one in which the connect time between two nodes approaches the memory access time of the system. Thus, a node could access data from memory or from another node in substantially the same time. To achieve such an objective, it is imperative that the switching algorithms employed never wait on a path to free up; that is, a path is either available or non-available at the instant it is tested. Messages must never wait in a buffer at an intermediate node waiting for the path to the next node to free up (which it may never do, causing partial or total lock-up). Thus, an alternate approach to the exhaustive interconnecting, switching, and message routing techniques provided by the prior art is absolutely necessary.

OBJECTS OF THE INVENTION

Accordingly, it is an object of the invention to provide a method and associated apparatus for the routing of messages in parallel and distributed processing systems in which the number of paths to be tried before a failure condition is determined, is minimized.

It is another object of the invention to provide a method and associated apparatus for the routing of messages in parallel and distributed processing systems in which the time to establish a successful connection is minimized.

It is yet another object of the invention to provide a method and associated apparatus for the routing of messages in parallel and distributed processing systems in which the complexity of the message transmitting logic at each node is minimal.

It is still another object of the invention to provide a method and associated apparatus for the routing of messages in parallel and distributed processing systems in which the complexity of the message switching logic at each node is minimal.

It is still a further object of the invention to provide a method and associated apparatus for the routing of messages in parallel and distributed processing systems in which a tested path is either available or non-available for instant use.

It is yet a further object of the invention to provide a method and associated apparatus for the routing of messages in parallel and distributed processing systems in a which non-available tested path and all associated paths depending on the non-available path are pruned from further testing in the process of finding an available path whereby redundant testing of paths which will result in failure, is eliminated.

BRIEF DESCRIPTION OF THE DRAWINGS

Other objects and benefits of the invention will become apparent from the description which follows hereinafter when taken in conjunction with drawing figures which accompany it.

FIG. 5 is a simplified drawing of an 8-node hypercube depicting the minimum cycles existing for a message to proceed from Node 0 to Node 7 thereof;

FIG. 6 is a simplified drawing of a 16-node hypercube depicting the minimum cycles existing for a message to proceed from Node 0 to Node 15 thereof;

FIG. 7 is a simplified drawing of a mesh network depicting the minimum cycles existing for a message to proceed from Node 11 to Node 33;

FIGS. 9a and 9b, illustrate an example of the congestion avoidance routing algorithm of the invention in an arbitrary non-symmetrical graph including the adjacency matrix thereof;

DETAILED DESCRIPTION OF THE INVENTION

The present invention as described herein has achieved its stated objectives by the implementation of novel heuristic-based adaptive routing algorithms which quickly eliminate or "prune" path segments from consideration and drive the system to a "success" or "failure" state in a minimum amount of time whenever a message link-up between two nodes is attempted. Before attempting a link-up, it also determines a minimum cycle breakdown of the possible paths between the originating node and the destination node whereby exhaustive testing of all paths is no undertaken (with attendant system tie-up and lost time) before success or failure is determined.

Figure 1:
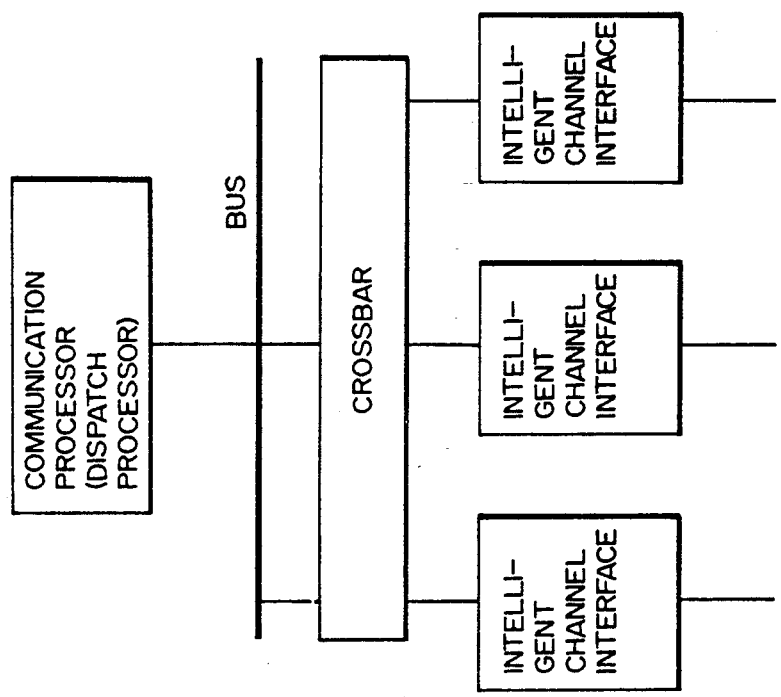
FIG. 1 is a block diagram of a communication architecture with an intelligent interface.

Simply stated, the problem is one of reducing the message latency experienced by communicating application entities in a given topology using an adaptive routing technique. A simple way to solve this problem is to use a distributed dynamic network model. As shown in FIG. 1 an intelligent channel which can make its own routing decision is used with the help of a crossbar network. Each message can request its own outbound channel and use it concurrently with other messages.

Because we use an intelligent channel for each link, the complexity of the channel must be simple. If each channel needs 2000 gates, then a 10 channel node needs 20,000 gates for it's communication portion. Memory occupies large silicon real-estate. This is the reason why routing algorithms which use one queue (memory) per channel are not acceptable for ensemble multiprocessors (shortest queue routing, priority queue routing).

Figure 2:
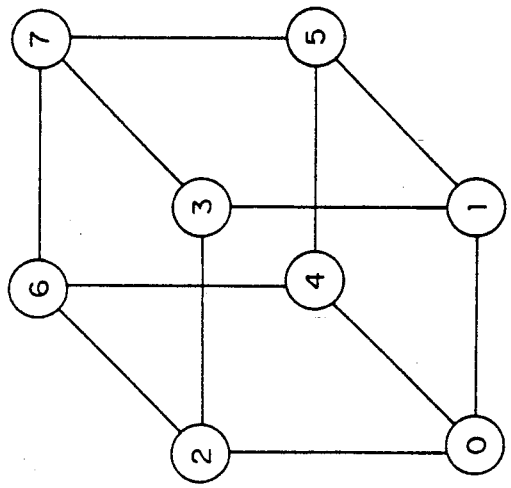
FIG. 2 is a graphical representation of an 8-node hypercube topology.
Figure 2:
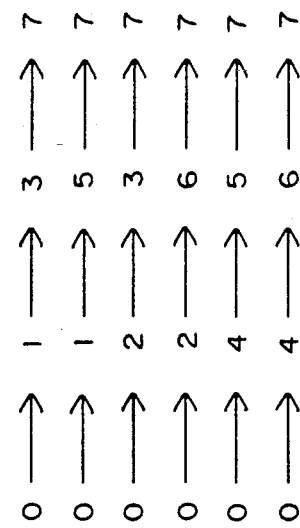

Many topologies have been used for interconnecting multiprocessors. Typically these networks are richly connected networks with equal bandwidth links. FIG. 2 shows an 8-node hypercube topology. If node 0 wants to send a message to node 7, this message can go on either one of the six possible paths shown in the figure. Not all the paths are arc-disjoint, for example, if link b 3-7 is busy then we do not need to try path 0-1-3-7 and 0-2-3-7.

Since there are many paths between two nodes in the system, if a requested link is congested, it is better to use an alternate link than to wait for the link to free up. Because many paths share links, selecting any free-outbound link based on local information (random routing, shortest queue routing) may lead the message into a more congested area. For example, if the link 3-7 is busy in FIG. 2, instead of sending the message to node 1, sending the message to node 2 may lead it back to link 3-7 (because link 2-3 is free). So, some form of global information must be used. However, it is very difficult to use global information under a very short latency constraint. The only solution to this problem is to have an adaptive routing algorithm which has the arc-disjoint information coded in the algorithm, whereby it can automatically avoid congestion.

Given the above communication characteristics of message passing ensemble machines, we propose a high speed routing algorithm based on heuristic best-first graph search. The novel adaptive routing algorithm implemented in the present invention enables messages to select the first available path by not repeating previously experienced congested traffic or node/link failures so that known busy or faulty links can be avoided and only untried nodes are explored in the process of determining and achieving the shortest time path. In accomplishing this objective, the invention has been shown (through modeling and simulation techniques) to significantly improve the communications performance of distributed and parallel processing systems.

What will be described hereinafter is a generalized scheme for an adaptive routing model for implementation on parallel and distributed processing systems. While the invention may be incorporated into a hypercube environment to achieve the maximum benefits thereof, those skilled in the art will readily recognize and appreciate that the invention and the techniques thereof could be used in other network topologies to advantage, as for example, the telephone switching network mentioned earlier herein. The scheme of this invention is intended to exploit the maximum network bandwidth offered by parallel networks. Adaptive routing techniques with deadlock/lock-up avoidance strategies are known in the art and have been shown to provide much higher performance over fixed routing strategies, as shown in the case of hypercube-based concurrent processor systems. The adaptive routing model of this invention is intended to exploit the path permutability offered by any given graph based on a connectivity analysis performed prior to link-up attempts. Hence this technique could be applied to various arbitrary topologies that utilize message passing communication. As those skilled in the art are well aware, an important goal when using an adaptive routing technique in a given topology is the reduction of message latency experienced by communicating application entities. In this regard, it should be noted in passing that the invention to be described herein, when specifically applied to hypercube computers and based on the connectivity analysis process and adaptive routing model of this invention incorporated therein, has been shown to reduce hypercube message routing latency by an order of magnitude.

The primary goal of this generalized adaptive routing model is to take advantage of highly parallel architectures to support both regular and irregular application communication patterns. A variety of applications utilize parallel architectures to exploit inherent parallelism at a course-grain or a fine-grain level. The performance of parallel algorithms depends in a large part on the amount of latency experienced by messages flowing through the interconnection network that, of necessity, binds the processors in a parallel system architecture. The most significant source of overhead in parallel systems using message passing communication is contributed by routing latencies caused by message congestion. What is to be described hereinafter is a generalized adaptive routing model for use in distributed/parallel system architectures with an arbitrary interconnection topology. This routing model utilizes the underlying interconnection graph while partitioning the graph by locating all of the minimum cycles which do not overlap. This is done to first define the specific set of nodes in a sub-graph that need to be visited while pruning the network for a path between the source and destination nodes. The adaptive routing algorithm with congestion and deadlock avoidance capability is then applied to search the best-first path that exists between the source and destination nodes.

The algorithm of this invention and the improvements achieved thereby are based, in part, on enabling messages to select the first available path by not repeating previously experienced congested node/link failures. Thus, known busy or bad links are avoided by network "pruning" and the shortest path setup time is achieved. In other words, only virgin or untried nodes (i.e. paths) are explored in the process of the search mechanism. As an added benefit, a considerably higher degree of network fault tolerance is achieved by using alternate routes in the event of link/node failures.

Figure 3:
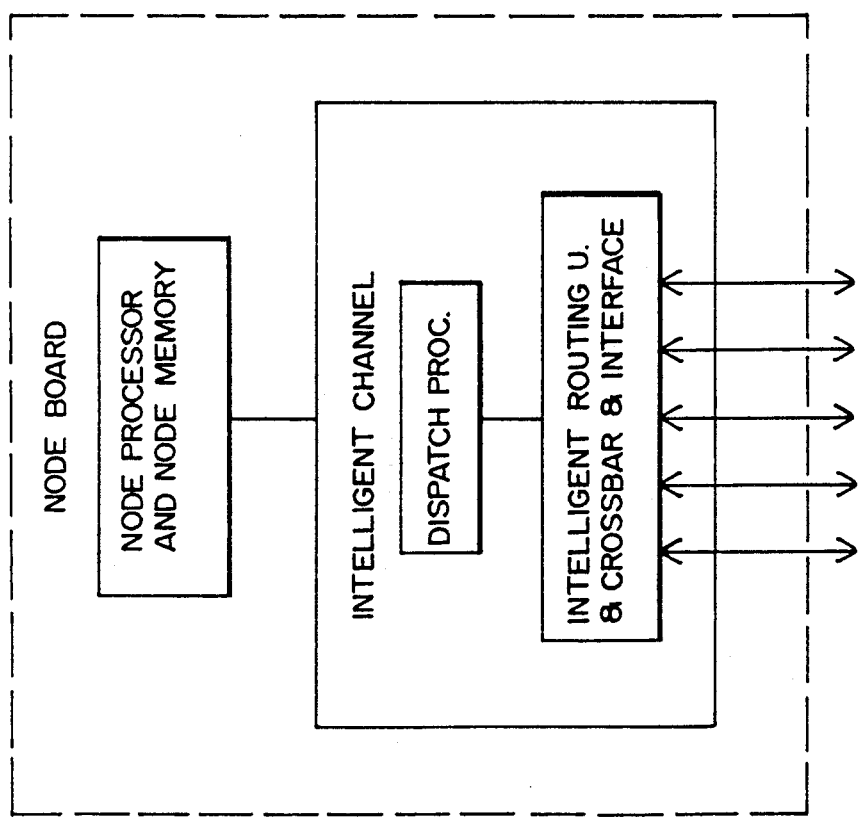
FIG. 3 is a block diagram of the node architecture of the invention.

A circuit switching routing method is used to facilitate the fast path searching algorithm with backtrack capability. The architecture of the node processor is depicted in FIG. 3. Each node includes a computation processor (node processor) and its associated node memory. Each node also has associated with it an intelligent channel, containing a plurality of intelligent routing units, a channel interface, crossbar switch and a dispatch processor. The dispatch processor is a memory interface for the intelligent channel and manages the arrival and departure of messages.

Figure 4:
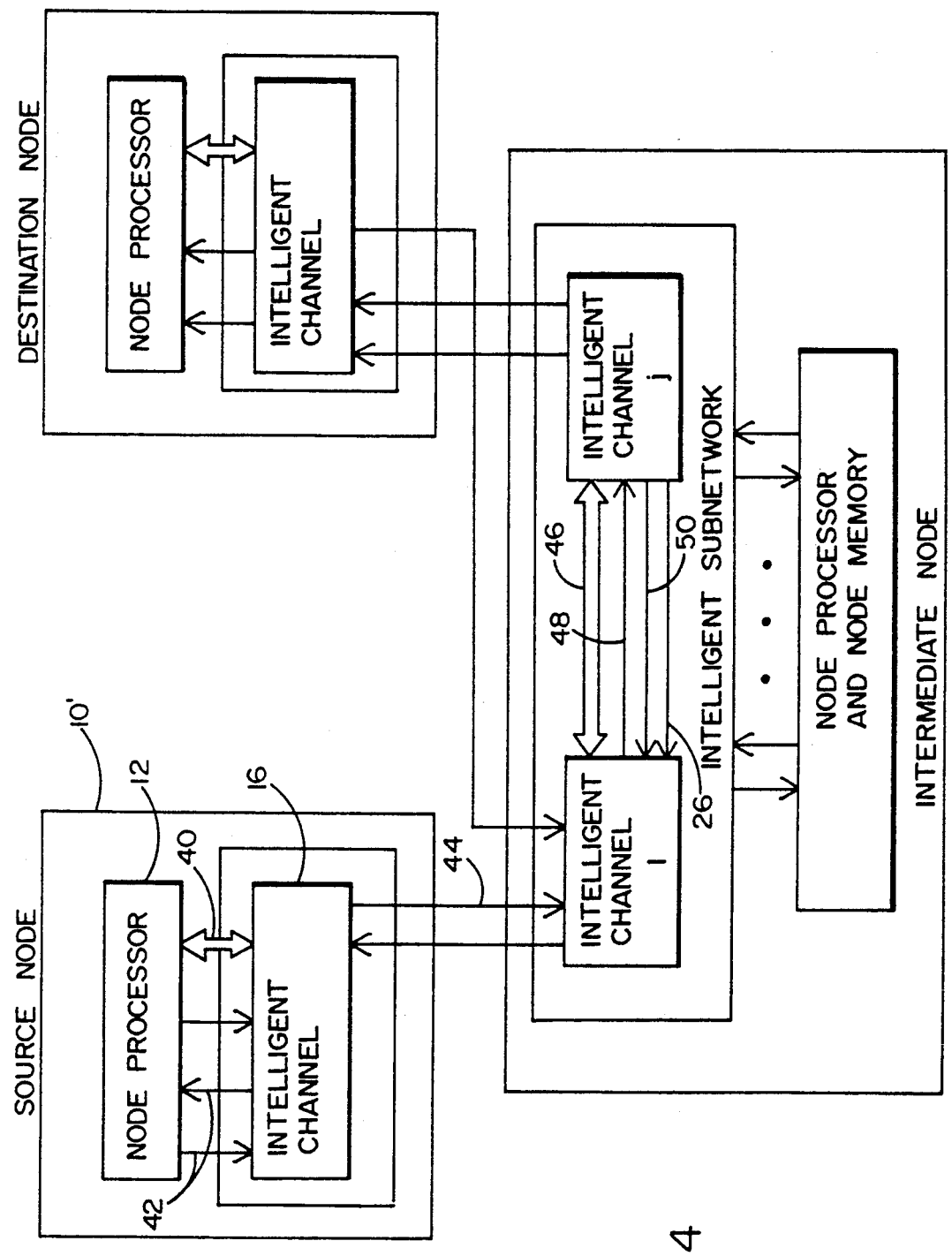
FIG. 4 is a diagrammatic illustration of circuit switching routing steps used in the present invention.

FIG. 4 depicts a simplified example of the steps involved in transmitting from a source node through an intermediate node's intelligent channel to a destination node. Each intelligent channel has two separate operating modes. These two modes are called a "path setup" mode and a "data transmission" mode. For purposes of describing this architecture, we shall focus primarily on the path setup mode, which is the routing mode for each intelligent channel.

The protocol for the proposed intelligent channel is as follows:

Step (a)—The source node intelligent channel sends a header word with the destination node's address embedded in the header to its selected next neighbor intelligent channel and reserves the path through which the header travels.

Step (b)—The intermediate intelligent channel evaluates the header, reroutes this header to its selected next neighbor intelligent channel which is not busy, and then switches the local crossbar switch to connect the header inbound channel to the outbound channel. If all of the selected intelligent channels are busy, then this intermediate intelligent channel will send backtrack status (by status signals) to the previous intelligent channel.

Step (c)—Step (b) is repeated until the header reaches its destination node.

Step (d)—The destination intelligent channel sends an acknowledgment back (by status signals) to the source intelligent channel through the intermediate node's channel interface and crossbar switch circuit. Network connection (a pipeline communication path) is set and information (data messages) can be transmitted.

The status signals in the intelligent channel network are two bits of encoded information passed back through the special status links. These two bits are interpreted differently in the path setup mode and the data transmission mode. In the path setup mode, the status bits are:

00—Ready to receive header
01—Ready to receive data
10—Header backtracked to the previous node
11—Header error, retransmit header Initially, the intelligent channels are in a path setup mode. After the header is received by a destination intelligent channel, the link status is changed to 01. The reserved intelligent channel network path enters a data transmission mode. In the data transmission mode, the status bits are:

00—Break pipeline to source
01—Ready to receive data
10—Wait for next data packet
11—Data error, retransmit data packet The routing protocol of this architecture involves a header word for each message. The header includes a channel history tag portion, a node destination portion, and a distance portion. These portions are used by a intelligent channel along with its routing control logic to perform an informed best-first heuristic search algorithm. The destination portion of the header defines the ultimate node's identification for which the message is intended. The distance and history of the header allows the intelligent channels in the network to keep track of the progress of the system as they establish a complete path from an originating to a destination node.

HEURISTIC SEARCH STRATEGY

The method of the present invention is a real-time adaptive routing network. Here, available or fault-free paths need not be specified by a source, because the routing header can be modified in response to congestion and faults encountered as a path is established. This method can be accomplished within an intelligent channel network if the nodes have intelligent routing units which are capable of performing the necessary routing header revisions. To perform this header revision, we have developed a very simple informed best-first heuristic search algorithm that can be hardwired in the switching elements.

The best-first strategy is used to locate the first available path that is completely disjointed from the path(s) already traversed as part of this search procedure. This informed distributed search algorithms is applied to perform this search using the most current dynamic congestion history information. It is based on heuristic estimation of paths.

The basic routing model is predicated on the following goal:

GOAL: To reach the destination node using the shortest path in the shortest amount of time (best-first search).

HEURISTIC SEARCH PROCEDURE (a) Only visit virgin or untried areas of the network following a backtracked routing header status reception. These areas are evaluated by using the channel history tag portion of the header.

(b) Perform a channel latch on the first available channel of all terminal channels that terminate in a destination node. This implies that all penultimate nodes in the network must be attempted for visits.

(c) If an outbound channel is found blocked, all of the successor links are considered blocked for the purpose of the channel history tag.

GENERALIZED HEURISTIC BASED ADAPTIVE ROUTING ALGORITHM

A generalized adaptive routing model is proposed for distributed/parallel system architectures with an arbitrary interconnection topology. This routing model utilizes the underlying interconnection graph while partitioning the graph by locating all the minimum cycles which do not overlap. This is done to define the specific set of nodes in a sub-graph that need to be visited while pruning the network for a path between the source and destination nodes. The adaptive routing algorithm with congestion and deadlock avoidance capability is then applied to search the best-first path that exists between the source and destination nodes.

This algorithm essentially enables messages to select the first available path by not repeating the previously experienced congested traffic or node/link failures. Thus, known busy or bad links can be avoided by network pruning and the shortest path setup time can be achieved. Hence, only the virgin or untried nodes (paths) are explored in the process of this search mechanism. As an added benefit, a considerably higher degree of network fault tolerance is achieved by using alternate routes in the event of link/node failures.

GENERALIZED ADAPTIVE ROUTING ALGORITHM

Before beginning the detailed description of the operation of the adaptive routing algorithm that comprises the invention, it is important to define the terms in which the description (and appended claims) will be made. First, a "graph" consists of a set of elements, which we will refer to as nodes herein, and a set of "links" connecting them. Two nodes are said to be "adjacent" if there is a link directly connecting them. A "path" is a sequence of adjacent nodes. There may be several paths between a given pair of nodes. Two paths are said to be "disjoint" if they have no links in common. The shortest paths between two nodes are the paths with the smallest number of links between the nodes. A "connected graph" is one in which there is at least one path between every pair of nodes in the graph. Some additional definitions as follows are also necessary to a proper understanding of the invention.

"Cycle"—a sequence of adjacent nodes that comes back to the starting node. "Adaptive routing"—is accomplished by a source node when sending a message from the source node to a destination node. For a source node to perform adaptive routing, there must exist more than one path between the source node and the destination node so that the source node can reroute the message to the destination node through two or more distinct links connected to it. In other words, unless there are two or more links from which to make a choice, there can be no adaptive routing. Adaptive routing, then, is message routing by a choice made at the source node.

"Congestion avoidance adaptive routing"—is accomplished by a source node sending a message from the source node to a destination node when the source node avoids paths which are congested with other message traffic. To accomplish this, more than one disjoint path must exist between the source node and the destination node. If a selected target link on the current message path is congested by one or more other messages, then all the non-disjoint paths sharing this common link are eliminated (i.e. not "visited"). A theorem related to this (proof not necessary and apparent to those skilled in the art and therefore omitted in the interest of simplicity) states—To perform congestion avoidance adaptive routing from a source node to a destination node, there must exist at least one cycle between the two nodes.

"Minimum cycle"—a cycle that does not contain other cycles. A theorem related to this (proof again not necessary and apparent to those skilled in the art and therefore omitted in the interest of simplicity) states— Nodes that may be visited by a congestion avoidance adaptive routing attempt can be included in a set of distinct minimum cycles.

Based on the foregoing definitions and related theorems, a generalized paths-to-test connectivity analysis algorithm (i.e. method of message routing) for use in limiting the nodes which are visited before success or failure is determined according to the present invention can be set forth as the following steps:

NODE PRUNING PHASE

1. Assign the destination node as the current node. (Depending on the exhaustiveness of the search, the target nodes can be the destination node for basic search or the penultimate nodes (on the shortest paths from source node to destination node) of the destination node for more exhaustive search or the penultimate nodes of the penultimate nodes of the destination node for even more exhaustive search or . . . ). Color all the nodes between target nodes and destination node.

2. Use the minimum number of maximum intersected non-overlapping minimum cycles to "color" (i.e. include) all of the penultimate nodes (on the shortest paths between the source and destination nodes) of the current nodes.

3. Assign non-colored nodes included by the selecte minimum cycles with the shortest distance to the source node as the penultimate nodes.

4. Assign colored nodes as current nodes.

5. If the penultimate node (on the shortest paths between the source and destination nodes) is the source node, then continue to step 6; otherwise, repeat steps 2, 3, 4 and 5.

6. Assign source node as current node.

7. According to the order that minimum cycles are taken, select the first available (not busy or not faulty) path from the current node to the destination node and send header through that path to the next node. Do not repeat the paths that intersected with the previously taken minimum cycle. If no path can be found and current node is source node, then exit algorithm with routing failure flag set. If no path can be found and current node is not source node, then backtrack the header to the previous node and repeat step 7.

8. Assign next node as current node.

9. If current node is destination node then exit algorithm, otherwise repeat step 7, 8 and 9.

Based on the congestion avoidance adaptive routing algorithm of the present invention, each time the header has been forwarded to a node, there exists at least one virgin path between this node and the destination node. This characteristic is evident from the following:

Let us assume the routing header is at a node $n_i$ which is i hops away from the message source node. If we want to forward the header to node $n_{i+1}$ which is $i+1$ hops away from the message source node and if there are N minimum cycles (taken during the node pruning phase) that includes node $n_{i+1}$ and K out of the N minimum cycles have been traversed previously, then based on the definition of the congestion avoidance adaptive routing algorithm, in order to find a path which does not repeat the previous traversed paths (virgin path), there has to be at least one non-overlapping minimum cycle.

If K is equal to N, when the header has been forwarded to node $n_{i+1}$, there does not exist a virgin path between the node $n_{i+1}$ and the destination node. So, now we have to prove that K does not equal N.

Assume M minimum cycles are traversed at i hops to cover the K minimum cycles at $i+1$ hops and $M+L$ minimum cycles are traversed at $i+1$ hops to cover the minimum cycles at $i+1$ hops.

Based on the definition of the adaptive routing algorithm, there has to exist at least one non-overlapping minimum cycle for the header to be forwarded to the next hop. So, L is greater than or equal to one.

If $K=N$ then $M=M+L$. Because L is greater than or equal to one, this is not true. So K does not equal to N and N is greater than K.

So, there exists at lest one virgin path between node $n_{i+1}$ and the destination node.

All of the colored nodes are the intermediate nodes that may need to be visited by the subsequent adaptive link-up routing scheme in an attempt to either establish a successful link between the source and destination nodes or determine that such a link cannot be established on this attempt. Note that the set of colored nodes is not unique for each adaptive routing attempt; so, different combinations of minimum cycles need to be investigated with the algorithm for different adaptive routing attempts.

Another interesting characteristic of the adaptive routing algorithm is that the exhaustiveness of the search can be varied by assigning the target node close to or away from the source node. All the nodes between the target nodes and the destination node need to be attempted exhaustively. If the target node is assigned as source node, then it becomes an exhaustive search. This exhaustive search will attempt to try all the paths between the source and destination node. If the target node is assigned as the destination node, then a faster search, which only attempts to try a few paths, is used.

An example of how the above-described algorithm is applied will now be described with reference to the 8-node hypercube structure shown in simplified form in FIG. 5 with the nodes 10 thereof labelled from 0 to 7 for convenience of individual identification. Assume that Node 0 wants to send a message to Node 7. To determine the nodes which will be visited, if necessary, to attempt the link-up, we start by assigning Node 7 (the destination node) as the current node. From Node 7, Nodes 7, 3, 1, 5 form a minimum cycle according to the definition thereof. Penultimate nodes 5 and 3 of the minimum cycle are then colored. Also, since Node 6 is also a penultimate node of Node 7, we also need to include the non-overlapping minimum cycle comprising Nodes, 7, 6, 2, 3 and to color Node 6. Note that we do not include minimum cycle 7, 6, 4, 5 because all the penultimate nodes are colored. Also, because this minimum cycle overlaps the previously included minimum cycles, it is not included according to the definition of the algorithm.

Nodes 1 and 2 are then assigned as the penultimate nodes with the three colored nodes (3, 5, 6) being assigned as the current nodes. By now taking minimum cycle 3, 2, 0, 1, we can color Nodes 1 and 2. Since Node 0 is the source node, the algorithm is finished and can be exited. Based on the algorithm, Nodes 1, 2, 3, 5, 6 have been determined as those that may need to be visited to establish the existence (or non-existence) of a successful path between Nodes 0 and 7; but, note that it has also been established that we need not waste time on trying (i.e. visiting) Node 4.

FIG. 6 depicts an example of the above algorithm employed on a 16 node hypercube. Note that the algorithm indicates that only the nodes 10 thereof labelled as 1, 2, 3, 5, 6, 7, 11, 13 and 14 need to be visited to decide whether or not we can successfully route through the network from Node) to Node 15. FIG. 7 depicts the results of applying the algorithm to a mesh topology in order to go from the node 10 labelled 11 to the node 10 labelled 33. Based on the results of the algorithm as depicted, we can see that alternate X and Y axis routing is the most desirable. This is because there are two choices presented at each intermediate node.

Figure 8:
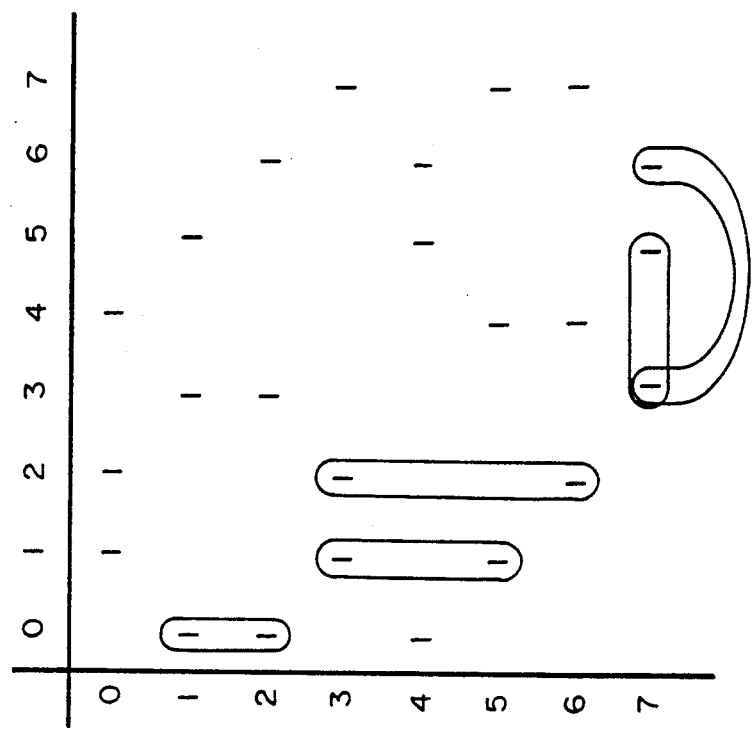
FIG. 8 is an illustrative example of an adjacency matrix that may be used to calculate colored nodes for the topology of FIG. 5 using the algorithm of the invention herein.

For a systematic solution, we can use the algorithm on an adjacency matrix to calculate colored nodes. As an example, the adjacency matrix of the graph of FIG. 5 is shown in FIG. 8. By taking the set of column 3 and 5 on row 7, we can find the intersected column of row 3 and row 5 is column 1. Taking set 3, 6 on row 7, we can find column 2 as the intersecting column of row 3 and row 6. Repeating the above step by taking the intersection of row 1 and row 2, we determine that we can read column 0. So, the algorithm stops. All the selected rows are the nodes that needed to be visited.

Figure 9A:
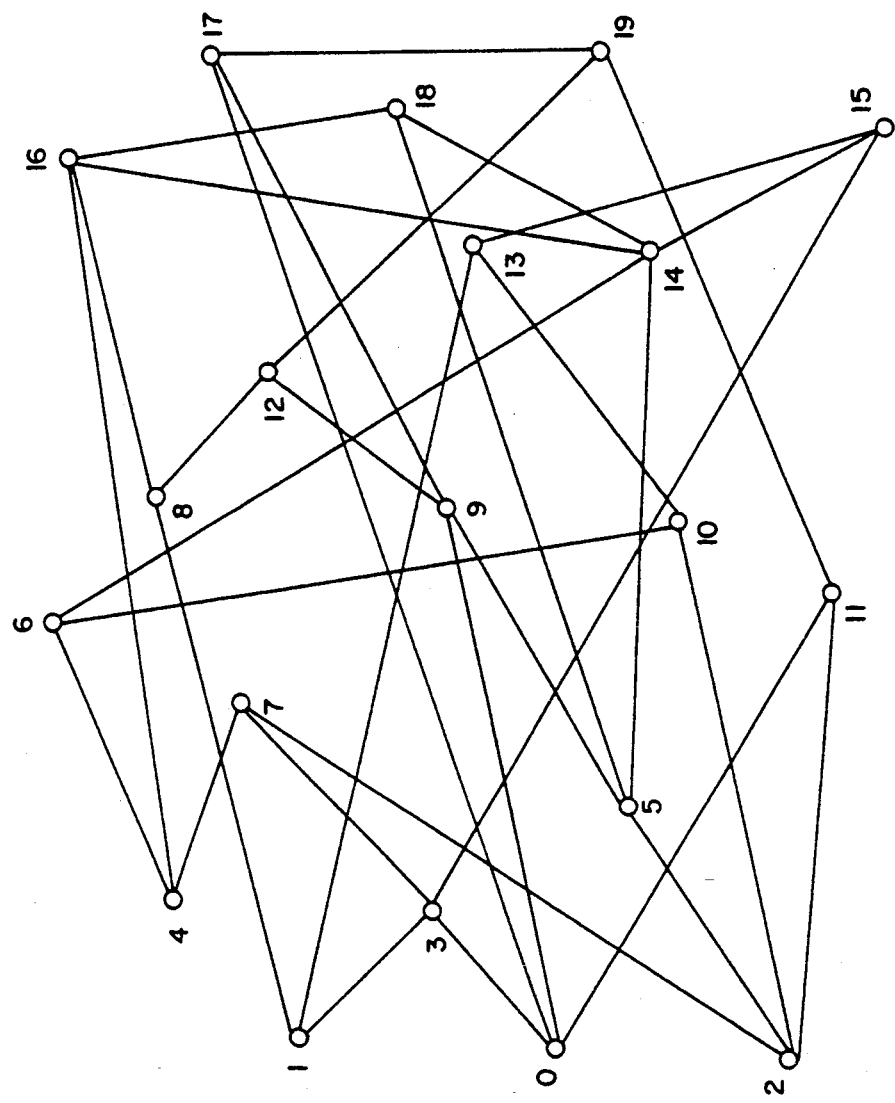
Figure 10:
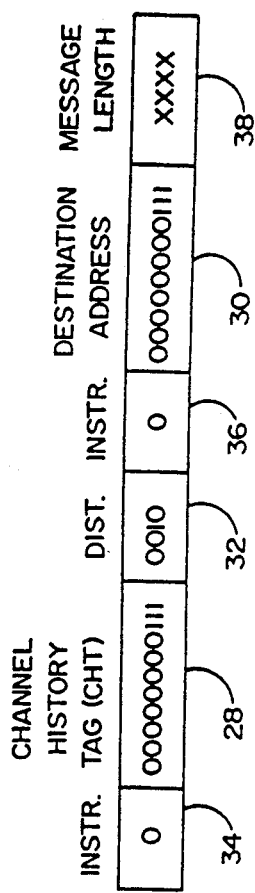
FIG. 10 is a drawing showing the construction of a header as employed with messages in one embodiment of the invention.

All the examples we have shown above are symmetrical graphs. This type of graph is the most popular graph used for interconnecting multiprocessors. For some special purpose implementation, for example: space computers, a non-symmetrical graph may be necessary. FIG. 9, comprising FIGS. 9a and 9b, shows an example of applying the congestion avoidance routing algorithm to an arbitrary non-symmetrical graph.

ADAPTIVE ROUTING SCHEMES ON HYPERCUBE TOPOLOGY

The congestion avoidance adaptive routing algorithm can decide the nodes that we need to visit to avoid previous experienced congestion. For implementing on a specific graph, further optimization can be accomplished by adjusting the exhaustiveness of the search algorithm. Two algorithms for the hypercube topology will be explained and are designated as the k algorithm and the k*(k−1) algorithm. In both of the search algorithms, all nodes traversed along the entire message path are visited exactly once.

ALGORITHM k DEFINITION

GOAL: To latch the first available terminal channel to the destination node using the first accessible penultimate node.

SEARCH CRITERIA: At most one attempt will be made to read all given penultimate nodes.

TIME COMPLEXITY: Order of (k+C1) hops where k=number of channels per node log (N) and C1=number of terminal channels busy. Therefore, algorithm k has a performance on the order of k.

ALGORITHM k*(k−1) DEFINITION

GOAL: To latch first available terminal channel to the destination node using the first accessible penultimate node.

SEARCH CRITERIA: Every possible attempt will be made to reach all the given penultimate nodes.

TIME COMPLEXITY: Order of (k+C2) hops where k=number of channels per node=log (N) and C2=(number of terminal channels busy)$^2$. Therefore, algorithm k*(k−1) has a performance on the order of k*k and hence is more exhaustive than algorithm k.

Starting first with an explanation of the k algorithm, the steps are an orderly sequence which includes:

| STEP NO. | ACTION |
| --- | --- |
| 0 | Initialize pointers to root or originating node; |
| 1 | Start with the root node (i = n−1); |
| 2 | Scan message header node i starting form lowest available channel if $b_i = 0$ |
| 3 | Locate first available channel; lowest available channel = first available channel; adjust pointers; |
| 4 | If (first available channel = unlatched) then latch first available channel and transmit header to node (i−1); hop = hop+1; else go to step 2; |
| 5 | If no available channel at node (i) then if (i not equal n−1) then backtrack to node (i+1); history vector $[b_{n-1}...b_i...b_0]$ = $[0_{n-1}...0_{n+1}1_i...1_0]$; hop = hop−1; no. of tries left at node (i+1) = {(fan-out at node (i+1)) − (# of bits = 1 in history vector)} = n hops − i−1 |
| 6 | if (number of tries left at node (i + 1) > 0) then i = i+1; go to step 2; else go step 5. |

Having explained in simple terms the operation of the k algorithm, a representative example will be used in conjunction with the information supplied in Table 1. Table 1, hereinafter, is a representative example of the above-noted steps wherein it is assumed that the originating node is node number 0 and the destination node is node number 15. A left to right arrow (→) indicates that a path has been established between the adjacent nodes. The symbol of *> indicates that no path was found, and a right to left arrow (←) indicates a backtrack. An arrow with a slash (—/→) indicates that a node other than an ultimate node has been tried once unsuccessfully and thus is not tried again.

TABLE 1

```
 1. 0 ——→ 1 ——→ 3 ——→ 7    *> 15
                    ←——
 2. 0 ——→ 1 ——→ 3 ——→ 11   *> 15
             ←——    ←——
 3. 0 ——→ 1 ——→ 5 —/→ 7       15
 4. 0 ——→ 1 ——→ 5 ——→ 13   *> 15
                    ←——
 5. 0 ——→ 1 ——→ 9 —/→ 11      15
 6. 0 ——→ 1 ——→ 9 —/→ 13      15
             ←——    ←——
 7. 0 ——→ 2 ——→ 3 —/→ 7       15
 8. 0 ——→ 2 ——→ 3 —/→ 11      15
 9. 0 ——→ 2 ——→ 6 —/→ 7       15
10. 0 ——→ 2 ——→ 6 ——→ 14   *> 15
      ←——    ←——    ←——
```

End first trial unsuccessfully

As shown in Table 1 at line 1 paths were latched from node 0 to 1 to 3 to penultimate node 7. No path from 7 to 15 was available. In accordance with the k algorithm, a penultimate node such as node 7 is tried once only and it is not again checked during any one trial. The unsuccessful trial at node 7 is noted in the history section of the header and, as shown in line 2, the next available route from 3 to 11 was checked. The route was also found unavailable. Again, the history section is updated to reflect that 11 was an unsuccessful trial. Since no further possibilities from node 3 (other than 7 and 11) are available, the header is backtracked away from 3 to node 1 where the next unexplored lowest-ordered path is checked. In line number 3, the path from node 1 to node 5 is latched, but the path from 5 to 7 is not tried because 7, a penultimate node was not earlier successful when tried. (See line 1).

Assume that the path from node 5 to 13 is not available because all channels at node 13 are busy. The busy condition of node 13 is stored in the header history and penultimate node 13 will no again be tried during this search cycle. At this point the search history reflects the fact that the first four lowest-order trials have been exhausted and that channels at nodes 7, 11 and 13 are eliminated from further trials during this search cycle. Lines 5 an 6 of Table 1 are latched to node 9 but those from 9 to 15 go through nodes 11 and 13 and these are not tried further because nodes 11 and 13 have already been eliminated from the search tree. The search at line 6 is now backtracked to the root node 0. Next, at line 7, a path is established from node 0 to node 2. At node 2 the paths through node 7 or node 11 have already been eliminated so they are not tried. Table 1 shows a successful trial from node 2 to node 6. At node 6 one path to node 15 is through node 7 which is already eliminated. Node 6 also has available to it a path through node 14 and thus that path is checked. Assume that node 6 checks node 14 and a check from 14 to 15 shows that channel 14 is busy. At this point the instant search trial is terminated because all of the penultimate node paths go through eliminated possibilities. Accordingly, the search trial will again restart with the lowest order channel paths as shown by line 1 of Table 1 and repeats in the above-described manner until a successful path has been latched from an origin to the destination node.

The k*(k−1) algorithm is a more exhaustive search than the k algorithm. The following description of the sequence of steps applies to the k*(k−1) algorithm.

| STEP NO. | ACTION |
|---|---|
| 0 | Initialize pointers to root node. (node i); |
| 1 | (i = n); initial history vector [b(n)...b(1)] = [0...0]; hop = 0; for (i = 1; i< = n; i ++) {b(i) 0; chan_step(i) = 1; return_hdrs_fwd(i) = 0; hdr_returned_back(i) = 0;} i = n; hop = 0. |
| 2 | While still not at destination node, visit each penultimate node i−1 times precisely. Start with lower channels and progressively move the header forward to the child specified by chan_step(i). If all channels evaluated by chan_step(i) cannot be latched, move back to the next level parent until a parent is reached where unused channels are found. All nodes traversed along the entire message track are visited exactly once. |
| SUB-STEP | |
| 2.1 | While (i > 0), using dst_node as index and chan_step(i) as offset, evaluate the next out_chan(i) that will be targeted for transmission |
| 2.2 | out_chan(i) = child(i, chan_step(i)); next_avail_chan(i) − out_chan(i); if (next_avil_chan(i) == unlatched) {latch(next_avail_chan(i)); xmit(hdr,child(i,out_chan(i)); /*xmit to child of node i*/ i = i − i} |
| 2.3 | else if (next_avail_chan(i) == latched) if (b(i) == 0) switch (chan_step(i)) |
| 2.4 | case '1' : chan_step(i) = chan_step(i) +1; break; |
| 2.5 | case '2' if (i > 2) chan_step(i) = 1; break; |
| 2.6 | case 'j' : if (i > 2) break; |
| 2.7 | case 'l' : while (chan_step(i) == 1 && b(i) == 1) if (i ! = n) b(i) = 1; xmit_back(hdr, parent(i)); i++; hdr_returned_back(i)++; if (b(i) == 0) if (chan_step(i) < 2 chan_step(i)++; else if (chan_step(i) == 2 && i>2) chan_step i) = i; |
| 2.8 | else if (b(i) == 1) if (chan_step(i) = i) chan_step(i) = chan_step(i) − 1; else if (chan_step(i) == i−1 && i>2) chan_step(i) = 1; |
| 2.9 | return_hdrs_fwd(i) = hdr_returned_back(i+1); hop + hop −1; if (return_hdrs_fwd(i) == 0 && i >= 3) temp1 = i. |
| 3 | Prune the sub-tree to be visited in future (ahead of time) by looking the no. of times the header was returned at this node in the past. This consideration removes possibilities that otherwise may be revisited. while (i >= 3) if (hdr_returned_back <2) chan_step(i−1)++; else if (hdr_returned_back == 2) chan_step(i−1) = i−1; i = i−1; i = temp1; |
| 4 | If the header returned back was already a |

| STEP NO. | ACTION |
|---|---|
| | -continued |
| | returned header (reflected by a positive value for the field return__hdrs__fwd at node i), then some further pruning ahead of visiting future nodes is necessary.<br>else if (return__hdrs__fwd(i) > 0 && i >= 3)<br>  temp2=i<br>  while (i >=3)<br>       chan__step(i−1) = 2;<br>       i = i−1;<br>  i = temp2. |

Table 2 uses the symbology of Table 1 and explains a representative example for this second algorithm, k*(k−1), for a message header from node 0 to node 15.

TABLE 2

```
0       1      3 ⟶ 11  *> 15
             ⟵     ⟵
0         1 ⟶ 5 ⟶ 13  *> 15
                 ⟵
0       1      5 ⟶ 7   *> 15
             ⟵     ⟵
0         1 ⟶ 9 ⟶ 13  *> 15
                 ⟵
0       1      9 ⟶ 11  *> 15
       ⟵     ⟵
0 ⟶ 2 ⟶ 10 ⟶ 14  *> 15
                 ⟵
0       2     10 ⟶ 11  *> 15
             ⟵     ⟵
0         2 ⟶ 6 ⟶ 14  *> 15
                 ⟵
0       2      6 ⟶ 7   *> 15
       ⟵     ⟵
0 ⟶ 8 ⟶ 12 ⟶ 14   > 5
                 ⟵
0       8     12 ⟶ 13  *> 15
       ⟵     ⟵
```

End first trial unsuccessfully

In Table 2 second trials at nodes 7, 11, 13 and 14 were made. This approach differs from the k algorithm of Table 1 because in the k algorithm a penultimate node is tried one time only. In the k*(k−1) algorithm a penultimate node is tried k−1 times.

The heuristic search strategy outlined above is an informed search (i.e., it uses the current real-time network history tag to direct the search parameters). This type of search is particularly useful where the number of network links grows exponentially as the number of nodes grow. Table 3 outlines a comparison between the perfect search (exhaustive search of all channels) an an k*(k−1) heuristic search.

The reliability and performance improvement obtained from a multipath network such as the static hypercube interconnection, depend upon how effectively the alternate available paths are used by the routing algorithm. The following is a routing complexity assessment where backtracking is part of the search strategy.

STATEMENT: Let H(n) be a distributed network connected using a hypercube topology that utilizes real-time routing with backtracking capability for the message header during the path setup process. Let there exist a node x(i) and let c(i) be the associated collision factor (i.e. the number of colliding message headers at node x(i)) encountered by a message header such that x(i) is a distance of i from the destination node and that x(i) is forced to return the header to the last forwarding node.

TO PROVE: That there exists a limited number of virgin paths (as shown in FIG. 5) that may be used by a backtracked message header (according to a search strategy specified by algorithms k and k*k−1) such that it does not encounter the already discovered congested nodes on a message track. This number of untried paths is a function of i, and n where n is the number of hops between the node evaluating such virgin paths and the destination node.

PROOF: Node x(i) has i! paths to destination node, where i is the number of ops from x(i) to destination node. Node x(i+1) that precedes node x(i) has (i+1)! paths to destination, where (i+1) is the number of hops from node x(i+1) to destination.

When a header backtracks from node x(i) to node x(i+1), it gains $(i+1)! - i! = (i)*(i)!$ paths to destination.

It is assumed that i is selected such that smallest i satisfies: $(i) >= (c(i)+1)$, where c(i) is the collision factor at x(i).

Number of paths outside the i! paths that belong to node x(i)

$$= \{(i!)*(i) - ((i-1)!)*(i-1)*(n-1)\}$$
$$= \{(i-1)![i*i - (i-1)*(n-1)]\}$$

Number of virgin paths (i.e. VPATHS__K−1(i)) belonging to node x(i) as part of this subgraph as a fraction of (i)*(i!) using algorithm k*k−1:

$$= \{(i-1)![i*i - (i-1)*(n-1)] * n(n-1)/(i)*(i!)\} \text{ for}$$

permuting factor of $n*(n-1)$ at node x(i) for no header returned; and

TABLE 3

| | STEPS REQUIRED TO LOCATE PATH TO DESTINATION (FIRST FIT) (ALGORITHM K) TERMINAL CHANNELS BUSY | | | | | | | | | | | | | |
|---|---|---|---|---|---|---|---|---|---|---|---|---|---|---|
| M = 2 NUMBER OF NODES | 0 | | 1 | | 2 | | 3 | | 4 | | 5 | | 6 | | TERMINATE WITHOUT SOLUTION |
| | LB | UB | LB | UB | LB | UB | LB | UB | LB | UB | LB | UB | LB | UB | |
| ① N = 16, n = 4 | 3 | | 4 | 7 | 6 | 9 | 9 | 12 | | | | | | | FH 18 |
| | | | 1 | 4 | 3 | 6 | 6 | 9 | | | | | | | BH 14 |
| ② N = 32, n = 5 | 4 | | 5 | 9 | 7 | 11 | 11 | 15 | 19 | 23 | | | | | FH 35 |
| | | | 1 | 5 | 3 | 7 | 6 | 10 | 12 | 16 | | | | | BH 29 |
| ③ N = 64, n = 6 | 5 | | 6 | 11 | 8 | 13 | 12 | 17 | 20 | 25 | 29 | 34 | | | FH 67 |
| | | | 1 | 6 | 3 | 8 | 6 | 11 | 12 | 17 | 18 | 23 | | | BH 59 |

LB - LOWER BOUND, DESIGNATES MIN. No. OF HOPS WITH CONGESTION CONCENTRATED IN TERMINAL CHANNELS
UB - UPPER BOUND, DESIGNATES MAX. No. OF HOPS WITH CONGESTION PRESENT UNIFORMLY ACROSS NETWORK TERMINAL CHANNELS
FH FORWARD HOPS
BH BACKWARD HOPS

-continued $$= \{(i-1)!*[i*i - (i-1)*(n-1)]*(n*n - i*i - n + i)/(i)*(i!)\}$$

for permuting factor of $(n*(n-1) - i*(i-1))$ at node x(i) for one header returned.

Number of virgin paths (i.e. VPATHS_K−1(i+1)) belonging to node x(i+1) as part of this subgraph as a fraction of i*(i!) using algorithm k*k−1:

$$= \{[(i+1)!*n*(n-1)/(i)*(i!)] - \text{VPATHS\_K} - 1(i)\}$$

for a permuting factor of $n*(n-1)$ at node x(i+1) for no header returned; and $$= \{[(i+1)!*(n*n - i*i - n + i)/(i)*(i!)] - \text{VPATHS\_K} - 1(i)\}$$

for a permuting factor of $(n*(n-1) - i*(i-1))$ at node x(i+1) for one header returned. Likewise, the permuting factor of 2 is used to compute VPATHS_K−1(i+1) at node x(i+1) when the header is returned twice.

Total number of virgin paths belonging to node x(i+1) that will be attempted when using algorithm k are summarized below:

| Header_returned | VPATHS_K−1(i+1) at node x(i+1) |
|---|---|
| 0 | = (i*n+1−n)*(n*n−n)/i*i |
|   | = i*i+i when n=i+1; |
| 1 | = {[(i*n+1−n)*(n*n−n−i*i+i)]/i*i} |
|   | = 2*i when n=i+1; |
| 2 | = [(2*n(i−1)+2)/i*i] |
|   | = 2 when n=i+1 |

Total number of virgin paths belonging to node x(i+1) that will be attempted when using algorithm k are summarized below:

| Header_returned | VPATHS_K(i+1) at node x(i+1) |
|---|---|
| 0 | = (i*n*n+n−n*n)/i*i |
|   | = i when n=i+1; |
| 1 | = [(i*n* − i*n*i+n−i−n*n+i)/i*i] |
|   | = 1 when n=i+1 |
|   | Q.E.D |

For example, at node 0 when n=4, i=3

VPATHS_K−1(i+1)=12 for 0 headers returned

VPATHS_K−1)=6 for 1 header returned

VPATHS_K−1(i+1)=2 for 2 headers returned

The probability that a path will be successfully formed is based on computing the probability of successfully latching an outbound channel in a series of steps at each intermediate node. Let the process of latching a channel in hop n be denoted by event E(n).

We are interested in the probability that a series of events E(1), E(2), ..., E(n) will occur exactly in that order, thus forming a given path between the source and the destination node. Probability events E(1), E(2), ...E(n) will occur in that order in n trials at n intermediate nodes=$p(n)=p(E(1)*p(E(2)|E(1)) * \ldots * p(E(n-)|E(1)E(2) \ldots E(n-1)$ where probability $p(E(2)|E(1))$ is a conditional probability that event E(2) occurs, given that event E(1) has occurred. This is essentially true because a message header can only try to latch a channel in hop 2 if and only if it has already latched a channel in hop 1. Hence the sequence of occurrence is important in computing the overall probability of success (i.e., E(1) cannot occur before E(2)). Nodes closer to the destination node contribute a progressively decreasing probability of success and hence need to be pruned more exhaustively than earlier nodes (i.e., nodes closer to the source node). In addition, the effective number of retried paths for the header at each node x(i) is given by:

$$1/\Sigma(\text{VPATHS\_K}(i)*p(i)).$$

This is the expected number of retries that can be anticipated at node x(i) with a collision factor of c(i).

IMPLEMENTATION

The implemented routing control logic enables messages to select the first available path which does not repeat previously experienced congested traffic or node/link failures. Thus, known busy or bad links are avoided by network pruning and the shortest path setup time can be achieved. The links within the network topology are pruned by first eliminating paths already attempted unsuccessfully. Then, the untried, or virgin, network territories are systematically explored to select one of the many possible paths. Once a complete path has been traced and reserved, the path selections are latched to form a complete path for message transmission from the originating node to the destination node. The complete path may span many nodes and, since it is latched by the routing control logic before any data is sent, transmitted data need not enter any intervening node for interaction with the node's computer or memory during transmission. Data may be pipelined up to the hardware limits for the communication path. In other words, the novel approach to message transmission separates the establishing of a through-link from a sending node to a receiving node from the actual transmission of data from the sending node to the receiving node. This can have important speed considerations over prior art techniques where messages are dynamically routed by each intervening node. Typically, system data transfer can take place at a much higher speed than computational operations requiring memory access. Where the header of a message must be accessed by each intervening node in order for routing computations to be made, the computations are made at the slower speed and the overall throughput of the message is degraded. By contrast in this invention, once the link is established and latched, no computation is required by the intervening nodes and the message can pass through at data transfer speeds.

Figure 11:
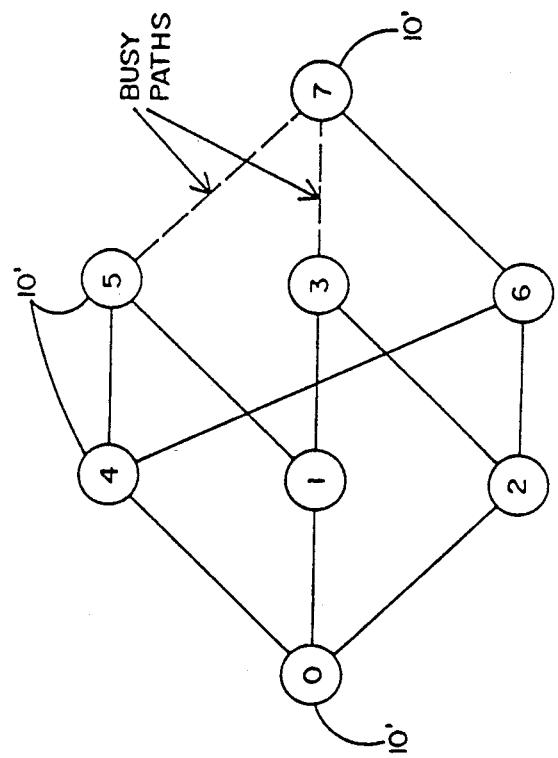
FIG. 11 is a simplified drawing of an 8-node hypercube of the type shown in FIG. 5 as employed in an example hereinafter wherein two of the links between penultimate nodes and the destination are busy.

Table 4 depicts a simplified example of the steps involved in transmitting from a source node through an intermediate node's intelligent channel to a destination node in relation to an example to be described with respect to the hypercube of FIG. 11 (which is basically the same as that of FIG. 5; but, with "busy" paths contained therein). The three connected and annotated nodes 10' of FIG. 5 (i.e. a source node, intermediate node, and destination node) will also be employed in the example.

The routing protocol of this architecture involves a header 24 word for each message. Of course, headers are well known in the art and are not, per se, a point of novelty of this invention. It is their content and the manner in which they are used which impacts on the novel aspects of this invention. A typical header 24 as employed in the tested embodiment is shown in FIG. 6 and includes a total of thirty-two serial bits. The header 24 will be discussed in greater detail shortly. For now, it is sufficient to note that the header 24 includes a channel history tag portion 28, a node destination portion 30 and a distance portion 32. These portions are used by the intelligent channel 16 along with its routing control logic to perform an informed best-first heuristic search algorithm. The destination portion 30 of the header 24 designates the ultimate node for which the message is intended. The distance and history portions, 30, 28 of the header 24 allow the intelligent channel 16 in the network to keep track of the progress of the system as they establish a complete path from an originating node 10' to a destination node 10'.

FIG. 11 depicts the six paths that are possible from an originating node 10', Node 0, to a destination node 10', Node 7. According to the binary designation method employed earlier herein, those paths can be designated as follows:

000—>001—>011—>111

000—>001—>101—>111

000—>010—>011—>111

000—>010—>110—>111

000—>100—>110—>111

000—>100—>101—>111

In the example which follows, Table 4 below describes the various steps which take place and are referred to therein.

TABLE 4

| | | |
|---|---|---|
| STEP A | | |
| AT NODE 0 | | |
| | ID | 000 |
| XOR | CHT | 111 |
| | | 111 |
| | | ↑ |
| | | 001 |
| XOR | ID | 000 |
| | | 001 |
| STEP B | | |
| AT NODE 1 | | |
| | ID | 001 |
| XOR | CHT | 111 |
| | | 110 |
| | | ↑ |
| | | 010 |
| XOR | ID | 001 |
| | | 011 |
| STEP C | | |
| AT NODE 3 | | |
| | ID | 011 |
| XOR | CHT | 111 |
| | | 100 |
| | | ↑ |
| | | 100 |
| XOR | ID | 011 |
| | | 111 |
| PATH TO NODE 7 BUSY, BACKTRACK TO NODE 1 | | |
| STEP D | | |
| AT NODE 1 | | |
| | ID | 001 |

TABLE 4-continued

| | | |
|---|---|---|
| XOR | CHT | 101 |
| | | 100 |
| | | ↑ |
| | | 100 |
| XOR | ID | 001 |
| | | 101 |
| NODE 3 BUSY, BACKTRACK TO NODE 1 | | |
| AT NODE 1, ALL CHANNELS OUT EXHAUSTED, BACKTRACK TO NODE 0 | | |
| AT NODE 0, TRY NODE 2 | | |
| AT NODE 2 | | |
| | ID | 010 |
| XOR | CHT | 110 |
| | | 100 |
| | | ↑ |
| | | 100 |
| XOR | ID | 010 |
| | | 110 |
| FROM NODE 2 GO TO NODE 6 BECAUSE NODE 3 is KNOWN TO BE BUSY | | |
| AT NODE 6, GO TO NODE 7 (DESTINATION) | | |

Before describing the example, certain aspects of the nodes 10' not yet addressed should be noted, with respect to FIG. 4 in particular. Internally, the paths between the node processor 12 and the intelligent channel 16 are contained within a data bus 40. There are also a control lines 42 extending between the node processor 12 and the intelligent channel 16. Externally, the paths are contained within a serial data channel 44. Within a particular node 10' (as particularly exemplified by the intermediate node of FIG. 4) the intelligent channels 16 are interconnected by a serial crossbar 46, a select signal line 48, and a busy signal line 50 in addition to a portion of the status signal link 26.

Turning now to the example, the originating node 10' formats a message header 24, which includes an instruction bit 34 at bit position 0, the channel history tag portion 28 at bit positions 1-11, the distance field portion 32 at bit positions 12-15, another instruction bit 36 at position 16, the destination field portion 30 at bit positions 17-27, and a message length field portion 38 at the remainder of the header 24's bit positions, i.e. 28-31 in a thirty-two bit header word. Obviously, timing, framing parity, and other information may be formatted into the serial bit stream of the header 24 as desired and necessary to a particular implementation. Each node 10', whether it is a source, intermediate or destination node, follows the same routing protocol and the same adaptive routing algorithm. Note that the preferred hardware routing logic can be adapted to different degrees of adaptive searching by simply changing the "distance" field portion 32 in the message header 24.

The source node processor 12 establishes that a message is to go to a particular destination node 10' and selects an appropriate intelligent channel 16. Thereafter, the following nodes' intelligent channels 16 in the network perform the routing algorithm operations as described hereinafter. As an example, assume that Node 0 originates a message header 24 and transmits it to Node 1. Node 0's identity is "000" and step A of Table 4 is applicable. The destination node is "111" of Node 7. The distance is a total of three hops; so, the distance field is set to one less than three or two, i.e. binary "010". In other words, a message must be routed through two intermediate nodes to go from Node 0 to Node 7. The channel history tag portion 28 is initialized to an all 1's condition and its output is, therefore, "111". The reflected term "001" and the node's identity, "000"

are again EXclusive ORed. This results in the designation of node "001", i.e. Node 1, as the next channel to select The intelligent channel 16 at Node 0 responds by moving the header 24 to Node 1 and reserving the circuit section between Node 0 and Node 1.

The above-described procedure repeats at Nodes 1 and 3 and, under normal circumstances, the header 24 would go on to Node 7, its destination, as shown in steps B and C in Table 4. For purposes of investigating the operation of the switching algorithm thoroughly, however, let us assume for purposes of our example that there is a busy path from Node 3 to Node 7 (as symbolized by the dashed connection in FIG. 11) for some reason. According to the basic philosophy employed, the header 24 does not wait at Node 3. Instead, a signal on the status link 26 from Node 3 back to Node 1 sets the channel history tag portion 28 in the message header 24 at Node 1 to reflect this busy condition and to inform Node 1 that the message header 24 must either be forwarded on another outgoing from Node 1; or, it must be backtracked to Node 0. The channel busy status signal from node 3 to Node 1 causes the channel history tag portion 28 of the message header 24 to be altered at Node 1. The channel history tag portion 28 is now changed to read "101". While the channel history tag portion 28 previously contained all 1's (as initially set), the middle "1" (i.e. the second hop) was responsible for getting the header 24 to "busy" Node 3; so, that middle "1" is changed to "0". At Node 1, the operation reflected at step D in Table 4 occurs and the header 24 is now routed to Node 5.

At Node 5, the header 24 is again supposed to be routed to Node 7; but, for purposes of pursuing our example further, let us assume that once again a "busy" condition is encountered. All of Node 1's outgoing channels are now exhausted; so, the message header 24's channel history tag portion 28 must be updated at Node 0 to reflect that Nodes 1, 3 and 5 have been pruned or eliminated from any further consideration for this one link selection attempt. Since the rightmost "1" thereof (i.e. the first hop) was responsible for getting the header 24 to the "busy" branch entered through Node 1, the channel history tag portion 28 is set to "110" and passed to Node 2, where it is again EXclusive ORed by that node's routing control circuit in the intelligent channel 16. At Node 2, the pruned, or eliminated, status of Node 3 causes the header 24 to be routed to Node 6 rather than to Node 3. As depicted in FIG. 11 a path from Node 6 to Node 7 is available and thus the message header 24 finally reaches its destination at Node 7.

At Node 7, that node's intelligent channel 16 recognizes that the message header 24 has reached a destination node 10' (i.e. the destination identifier portion 32 is equal to Node 7's identifier). An output from the destination node is sent back through the status link 26 from Node 7 to Node 6. A complete path is then latched because the sections from Node 0 to 2 and from 2 to 6 were held as the message header 24 progressed through those nodes' intelligent channels 16. Data transmission from Node 0 to Node 7 can now occur over a high-speed data line. The data does not interact with the node processors or memories at Nodes 2 and 6, nor does it require any further interaction with the hyperswitch processors 16 at those nodes 10'.

The reliability and performance improvement obtained from a multi-path network depends upon how effectively the alternate available paths are used by the routing algorithm. The network as described hereinbefore and as tested by the inventors hereof has demonstrated its ability to significantly improve the communications performance of the hypercube computer as well as systems of general topology. It fully utilizes all the hardware capability of the multi-path links and has the ability, with low overhead, to re-route with backtracking. Special features of the network are: low connection complexity, high fault-tolerance, ease of message routing, and very low message latency, as well as suitability for a distributed computer architecture. All of these are general requirements which should be satisfied by an effective interconnection network.

Wherefore, having thus described our invention, what is claimed is:

1. In a multi-node network containing a plurality of parallel and distributed switching nodes, the improvement for reducing the time to establish a through-path from the originating node to the destination node or make a decision that no through-path can be established at this time when routing messages from an originating node to a destination node; the improvement comprising:

connectivity analysis logic in each node that can be an originating node; said connectivity analysis logic having means for performing a minimum cycle breakdown of the possible paths between the originating node and the destination node to establish a list of nodes disposed along possible paths to be tried before attempting to establish a through-path to a destination node along said possible paths whereby exhaustive testing of all paths is not undertaken before success or failure is determined.

2. The improvement to a multi-node network of claim 1 wherein said minimum cycle breakdown means comprises logic for performing the steps of:

a) assigning the destination node as a current node;
b) using the minimum number of non-overlapping minimum cycles necessary to "color" (i.e. include) all the penultimate nodes on shortest, in number of nodes, paths between the source and destination nodes of the current nodes;
c) assigning non-colored nodes included by the selected minimum cycles with the shortest distance to the source node as penultimate nodes;
d) assigning colored nodes as current nodes;
e) if the penultimate nodes on the shortest paths between the source and destination nodes is the source node, then proceeding to step (f); otherwise, returning to step (b);
f) designating all the colored nodes as intermediate nodes that may need to be visited in any subsequent attempt to either establish a successful through-path between the source and destination nodes.

3. The improvement to a multi-node network of claim 1 additionally comprising:

each node that can be an intermediate node along a through-path containing pruning logic for pruning a non-available tested path and all associated paths depending on the non-available path from further testing during a process of finding an available path between the originating node and the destination node whereby redundant testing of paths which will result in failure is eliminated.

4. The improvement to a multi-node network of claim 3 additionally comprising:

each node that can be an intermediate node along a through-path containing backtracking logic for not waiting at the node for a link to a busy next-adjacent further node to free up and for backtracking to a next-adjacent previous node when no next-adjacent further node is immediately non-busy.

5. The improvement to a multi-node network of claim 1 additionally comprising:

each node that can be an intermediate node along a through-path containing an intelligent channel having two separate operating modes, wherein one of said two modes is a path setup mode in which the function of path establishing is performed and the other of said two modes is a data transmission mode in which the function of data transfer is performed whereby when the intelligent channel is in the data transmission mode data passes directly through the associated node and has no processing time added thereto by the associated node.

6. The improvement to a multi-node network of claim 5 wherein each said intelligent channel includes switching logic for performing the steps of:

a) when the associated node is an originating node, originating and sending a header with the destination node's address embedded in the header to a selected next neighboring node's intelligent channel and reserving the path through which the header travels; and b) when the associated node is an intermediate node;
b1) evaluating a received header and the header to a selected next neighboring node intelligent channel which is not busy and then switching a local crossbar switch of the intermediate node's to connect an inbound channel thereof to an outbound channel thereof whereby the intermediate node is placed in said data transmission mode; and b2) repeating step (b1) until the header reaches the destination node; and c) when the associated node is a destination node, sending an acknowledgment back to the source node's intelligent channel through the intermediate nodes to establish a network connection pipeline communication path in the data transmission mode so that messages can start to be transmitted by the originating node.

7. The improvement to a multi-node network of claim 6 wherein each said switching logic at an intermediate node includes logic for performing the step of:

if all the selected next neighboring nodes' intelligent channels are busy, then sending a backtrack status to the previous node's said intelligent channel 8. The improvement to a multi-node network of claim 6 wherein:

each of said intelligent channels includes a status signal link connected to said status signal link of next adjacent nodes to which it is connected.

9. The improvement to a multi-node network of claim 8 wherein:

each of said status signal links is a link bi-directionally transmitting a 2-bit status word which is interpreted differently in said path setup mode and in said data transmission mode.

10. The improvement to a multi-node network of claim 9 wherein:

a) in said path setup mode, the bits of said status word are interpreted as:
00—ready to receive header
01—ready to receive data
10—header backtracked to the previous node
11—header error, retransmit header; and b) in said data transmission mode, the bits of said status word are interpreted as:
00—break pipeline to source
01—ready to receive data
10—wait for next data packet
11—data error, retransmit data packet.

11. Switching apparatus for use in a network containing a plurality of parallel and distributed nodes for routing messages from an originating node to a destination node while reducing the time to establish a through-path from the originating node to the destination node or make a decision that no through-path can be established at this time comprising:

a) a separate node processor disposed in association with each node, each said node processor containing computing means and associated logic for execution thereby for making switching decisions from header information associated with messages being routed thereby; and b) an intelligent channel connected to said node processor to be controlled thereby, each intelligent channel having two separate operating modes, wherein one of said two modes is a path setup mode in which a function of establishing a path from an originating node to a destination node from said header information preceding data associated with a said message is performed and the other of said two modes is a data transmission mode in which a function of transferring data associated with a said message is performed, each intelligent channel having a plurality of input lines for connecting to said intelligent channels of next adjacent nodes to receive inputs therefrom and a plurality of output lines for connecting to said intelligent channels of next adjacent node to transmit outputs thereto, said input lines of a node being connected directly to said output lines when said intelligent channel of a node is in said data transmission mode whereby when a said intelligent channel is in said data transmission mode said data passes directly through the associated node and has no processing time added thereto by the associated node;

each said node processor of each node that can be an originating node contains connectivity analysis logic which performs a minimum cycle breakdown of the possible paths between the originating node and the destination node to establish a list of nodes disposed along possible paths to be tried before attempting to establish a through-path to a destination node along said possible paths whereby exhaustive testing of all paths is not undertaken before success or failure is determined.

12. The switching apparatus of claim 11 wherein said connectivity analysis logic includes logic for performing the steps of:

a) assigning the destination node as a current node;
b) using the minimum number of non-overlapping minimum cycles necessary to "color" (i.e. include) all the penultimate nodes on shortest, in number of nodes, paths between the source and destination nodes of the current nodes;
c) assigning non-colored nodes included by the selected minimum cycles with the shortest distance to the source node a penultimate nodes;
d) assigning colored nodes as current nodes;
e) if the penultimate nodes on the shortest paths between the source and destination nodes is the source node, then proceeding to step (f); otherwise, returning to step (b);

f) designating all the colored nodes as intermediate nodes that may need to be visited in any subsequent attempt to either establish a successful through-path between the source and destination nodes.

13. In a multi-node network containing a plurality of parallel and distributed switching nodes, the method of operation for reducing the time to establish a through-path from the originating node to the destination node or make a decision that no through-path can be established at this time when routing messages from an originating node to a destination node comprising the steps of:

a) at each originating node and before attempting to establish a through-path to a destination node along possible paths, performing a connectivity analysis accomplishing a minimum cycle breakdown of the possible paths between the originating node and the destination node to establish a list of nodes disposed along possible paths to be tried whereby exhaustive testing of all paths is not undertaken before success or failure is determined; and b) at each node that can be an intermediate node along a through-path and while attempting to establish a through-path to a destination node along possible paths;

b1) visiting the nodes on the list established in step (a); and b2) performing backtrack logic comprising not waiting at the node for a link to a busy next-adjacent further node to free up and backtracking to a next-adjacent previous node when no next-adjacent further node is immediately non-busy.

14. The method of claim 13 and at each node that is an intermediate node along a through-path;

a) first operating in a path setup mode in which the function of path establishing is performed; and b) after and only after a through-path has been established between an originating node and a destination node, then operating in a data transmission mode in which the function of data transfer is performed whereby when the nodes along a successful through-path are in the data transmission mode, data passes directly through the nodes and has no processing time added thereto by the nodes.

15. The method of claim 14 wherein the method includes the steps of:

a) at an originating node, originating and sending a header with the destination node's address embedded in the header to a selected next neighboring node and reserving the path through which the header travels; and b) at an intermediate node;

b1) evaluating a received header and re-routing the header to a selected next neighboring node which is not busy and then switching a local crossbar switch of the intermediate node to connect an inbound channel thereof to an outbound channel thereof whereby the intermediate node is placed in the data transmission mode; and b2) repeating step (b2) until the header reaches the destination node; and c) at a destination node, sending an acknowledgment back to the source node through the intermediate nodes to establish a network connection pipeline communication path in the data transmission mode so that messages can start to be transmitted by the originating node.

16. The method of claim 13 wherein said step of performing a connectivity analysis includes the steps of:

a) assigning the destination node as a current node;

using the minimum number of non-overlapping minimum cycles necessary to "color" (i.e. include) all the penultimate nodes on shortest, in number of nodes, paths between the source and destination nodes of the current nodes;

c) assigning non-colored nodes included by the selected minimum cycles with the shortest distance to the source node as penultimate nodes;

d) assigning colored nodes as current nodes;

e) if the penultimate nodes on the shortest paths between the source and destination nodes is the source node, then proceeding to step (f); otherwise, returning to step (b);

f) designating all the colored nodes as intermediate nodes that may need to be visited in any subsequent attempt to either establish a successful through-path between the source and destination nodes.

17. The method of claim 13 and additionally comprising:

at each intermediate node while attempting to establish a through-path to a destination node along possible paths, pruning a non-available tested path and all associated paths depending on the non-available path from further testing whereby redundant testing of paths which will result in failure is eliminated.

18. The method of claim 13 and additionally comprising:

at each intermediate node while attempting to establish a through-path to a destination node along possible paths, if all selected next neighboring nodes are busy, then sending a backtrack status to the previous node.

19. The method of claim 18 wherein said step of sending a backtrack status to the previous node comprises the steps of:

a) connecting a status signal link between connected next adjacent nodes; and, b) bi-directionally transmitting a 2-bit status word which is interpreted differently in the path setup mode and in the data transmission mode over the status signal link.

20. The method of claim 19 including the steps of:

a) in the path setup mode, interpreting the bits of the status word as,

00—ready to receive header
01—ready to receive data
10—header backtracked to the previous node
11—header error, retransmit header; and, b) in the data transmission mode, interpreting the bits of the status word as, 00—break pipeline to source
01—ready to receive data
10—wait for next data packet
11—data error, retransmit data packet.

* * * * *

UNITED STATES PATENT AND TRADEMARK OFFICE
CERTIFICATE OF CORRECTION

PATENT NO. : 5,170,393
DATED : December 8, 1992
INVENTOR(S) : Edward T. Chow and John C. Peterson It is certified that error appears in the above-identified patent and that said Letters Patent is hereby corrected as shown below:

Column 1, after the Title, insert the following paragraph:

--ORIGIN OF THE INVENTION

The invention described herein was made in the performance of work under a NASA contract, and is subject to the provisions of Public Law 96-517 (35 USC 202) in which the Contractor has elected to retain title.--

Signed and Sealed this

Seventh Day of December, 1999

Attest:

Attesting Officer

Q. TODD DICKINSON

Acting Commissioner of Patents and Trademarks